April 25, 1961  G. MALEK  2,981,145
MOTION PICTURE CAMERA CONTROL MECHANISM
Filed Sept. 30, 1957
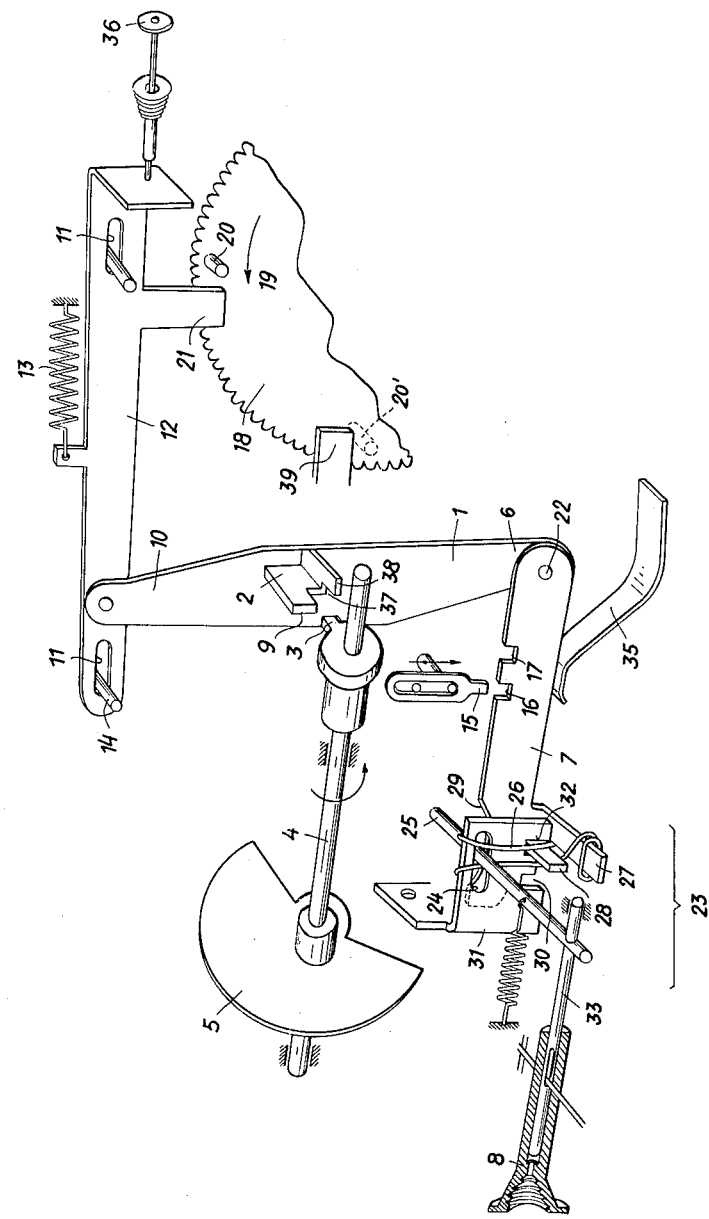
GEORG MALEK
INVENTOR.
BY Wenderoth, Lind & Ponack
Attys

United States Patent Office 2,981,145
Patented Apr. 25, 1961

2,981,145

MOTION PICTURE CAMERA CONTROL MECHANISM

Georg Malek, Vienna, Austria, assignor, by mesne assignments, to Alois Handler and Karl Vockenhuber, Vienna, Austria Filed Sept. 30, 1957, Ser. No. 687,176

Claims priority, application Austria Sept. 28, 1956

4 Claims. (Cl. 88—16)

This invention relates to a motion picture camera, in which, in addition to the arbitrarily operable motion picture release member, an end arresting device is provided, which prevents the running down of the drive of the camera until the spring has been completely relaxed. In most cases such end arresting devices are constructed in such a manner that the spring movement is utilized for the operation of the camera only as long as the spring is still capable of maintaining the adjusted frame frequency. In the known arrangements of this kind the operation is arrested by blocking the running-down movement of the spring. For this reason it is not ensured in most cases that the shutter is just closed at the time when the drive is arrested. If the shutter remains only for a few seconds in its open position, however, a certain part of the film will be spoiled by incident light. In a camera in which only half of the width of the film is exposed during one pass of the film whereas the other half of the width of the film is exposed only after the film has been turned round, such a continued opening of the shutter will even cause the other half of the film to be spoiled so that spoiled film portions occur in the scene. It has already been proposed to arrange the end arresting device and the motion picture release member to act on a common arresting member and to provide such an arrangement that upon release of the motion picture release member, i.e. when the operator of the camera releases the motion picture release member, the shutter will be held in its closed position. In the known arrangements of this kind, however, the end arresting device must move the common arresting member against the force whereby the motion picture release member is held. This is hardly possible just when the end arresting device is to become effective, i.e. when the spring drive has almost run down. For this reason the holding of the release member will cause the shutter to be held open, few seconds sufficing already to spoil the respective part of the film.

It is an object of the invention to avoid these disadvantages in such an arrangement, in which the motion picture release member and an end arresting device act on a common arresting member. The essential feature of the invention resides in that the motion picture release member and the end arresting device act on the common arresting member independently of each other and without influencing each other. As a result the closing of the shutter when the drive is arrested in ensured when the drive is arrested by the end arresting device as well as when it is arrested by the arbitrarily operable release member.

In a preferred embodiment of the invention the common arresting member is formed by a rocker lever, one end of which is engaged at one end by the motion picture release member and at the other end by the end arresting device whereas the locking member which intercepts the shutter in the closed position is provided in an intermediate portion of said lever. In this way the difficulties involved in the fact that the final arrest must be effected when the arbitrarily operable release member is held in its release position. If desired, the single-picture release and the end arresting device may act through the intermediary of a common intermediate member on the same end of the rocker lever because a still picture need not be interrupted by the end arresting device. On the other hand, those operating members which are to be rendered ineffective by the end arresting device, namely, the release member for starting the drive and the actuating member which sets the camera for a continued film feed movement, act on the other end of the rocker lever to enable the interruption of the movement of the drive by the end arresting device independently of the release position of said operating members.

In order to ensure a precise function of the end arresting device where a common arresting member, e.g. a rocker lever is provided, on which the motion picture release member and the end arresting device act independently of each other, the invention provides a device which locates the portion of the common arresting member which is associated with the motion picture release member independently of the possible unprecise operation of the motion picture release member. To this end the motion picture release member acts according to the invention through the intermediary of an interposed snap device on the common arresting member or rocker lever, which snap device moves an intermediate member, which acts on the end of the rocker lever or the like, to its release and locking positions and skips the intermediate positions. Such a snap device has the additional advantage that the quick shifting movement reduces the wear of the locking member.

The invention is diagrammatically illustrated in the accompanying drawing with reference to an embodiment shown by way of example.

The drawing is a perspective view of the actuating mechanism.

A locking member 2, which arrests the drive of the camera by engaging a nose 3 on the shaft 4 of the shutter 5, is provided in the intermediate portion of a rocker lever 1. The nose 3 is arranged so that the shutter 5 will always close the lens duct in the locking position. A strap 7 pivoted to the end 6 of the rocker lever 1 is movable by the motion picture release member 8 in the longitudinal direction of the latter. A displacement of the strap 7 to the right will cause the locking stop 9 of the locking member 2 to move to the right (when viewed as in the drawing) to release the nose 3. As soon as the strap 7 is displaced to the left, the locking stop 9 is moved into the path of the nose 3, the drive is arrested and the shooting of the motion picture is terminated. A slide 12 guided in guides indicated by slots 11 is provided at the other end 10 of the rocker lever 1 and is urged by the force of a spring 13 to the right into its end position, which is limited, e.g., by the rod 14. A vertically displaceable locking member 15 enables the continued feed movement to be started. When the release member 8 is in the release position (shown in the drawing) and the locking member 15 is moved into the recess 16 of the strap 7 the strap will be held in position for a continued film feed. When the release member 8 is released, the strap 7 being moved to the left and the locking member 15 is moved into the recess 17 of the strap 7, an unintended operation of the camera will be prevented.

A stop 20 is provided on a gear-wheel 18, which is connected to the drive and the direction of rotation of which is indicated by the arrow 19. As soon as this stop engages a nose 21 of the slide 11 the latter is moved to the left. Then the rocker lever 1 will swing counter-clockwise and the locking stop 9 enters the path of the nose 3 to arrest the drive of the camera in a position in which the shutter 5 closes the lens duct. This effects the end arrest of the camera whereas the strap 7 is in the release or feed position.

In order to ensure that the nose 3 properly engages the stop 9 and to prevent the nose from chattering over this stop, the end 6 of the rocker lever 1 and the strap 7 should be exactly in the release position, the pivot 22 now forming the centre of rotation of the rocker lever 1. To this end the actuation of the motion picture release member 8 and the release of this member are transmitted by means of a snap device 23 to the strap 7 and the rocker lever 1. A transverse rod 25 which acts by means of a spring 26 on lugs 27 and 28 of the strap 7, is moved in a stationary guide 24. The strap 7 has a flat recess 29, along which the transverse pin 25 slides, When displaced to the right (release movement) the transverse pin 25 engages this recess 29 to depress the strap 7 against the force of a spring 35 until the latch 28 of the strap 7 leaves a notch 30 of the stationary guide member 31. Then the spring 26 is prestressed towards the right and the latch 28 snaps into the rest 32 of the guide member 31. Thus, the strap 7 is suddenly moved into the release position shown in the drawing. When the transverse rod 25 is moved to the left from the position shown in the drawing, it slides again along the flat recess 29 of the strap 7 and depresses the latter until the latch 28 leaves the notch 32 and snaps into the notch 30 under the action of the spring 26, which is now prestressed towards the left. In this position the strap 7 is moved into the locking position, in which the drive is blocked.

In the illustrative embodiment shown in the drawing the transverse rod 25 is inserted in a longitudinal rod 33, which is longitudinally slidably guided in the release member 8. When actuated by pressure on the release member 8 this rod 33 is simply carried along to the right. When a wire release indicated at 34 is screwed into the release member 8 that release 34 will press directly on the left-hand end of the longitudinal rod 33.

36 indicates a wire release for making still pictures (single-picture motion). This wire release 36 acts also on the strap 12 and moves the same to the left, beginning in a position in which the strap 7 and the lower end 6 of the rocker lever 1 are in the left-hand position, the locking nose 3 engaging the locking stop 9. A displacement of the slide 12 to the left (single-picture motion) will cause the locking nose 3 to move through a recess 37 of the locking member 2 and to slide past the right side of the locking stop 9. After one revolution, however, the locking nose 3 engages a second locking stop 38 of the locking member 2 so that the shooting operation is terminated after this one revolution, after a single picture has been exposed. As the wire release 36 is released, the nose 3 is moved back into engagement with the locking stop 9. The recess 37 is dimensioned to permit of an axial movement of the locking nose 3 through this recess. In the peripheral direction, however, the clearance between the locking stop 38 and the locking stop 9 is too small to permit of a passage of the nose 3.

In the diagrammatic showing of the drawing the end arrest is effected by a stop 20 carried by the gear-wheel 18. In order to enable a free selection of the running period after which the end arrest is to become effective, this stop 20 may be arranged to be slidable or dislocatable in a manner not shown, to cause it to engage the tongue 21 of the slide 12 and thus effect the end arrest at an earlier or later time.

39 denotes a stop which limits the winding of the drive by coacting with the stop 20 in the position 20' indicated by a broken line. For this purpose a separate stop may be provided instead of the stop 20, if desired.

What I claim is:

1. In a motion picture camera the combination comprising a film advancing and shutter rotating mechanism including a spring motor, a rotative shutter, a rotative stop coupled to said rotative shutter, a locking member cooperating with said rotation stop intercepting said shutter in its closed position when said mechanism is stopped, a lever connected to said locking member, a first and a second control member cooperating with said locking member and releasing said film advancing and shutter rotating mechanism for multiple exposures and stopping said mechanism respectively, said first control member being manually operable, an automatic spring motor drive arresting means for operating said second control member after a predetermined unwinding of said spring motor, both control members being connected to said lever by hinges, spaced from each other and from said locking member, said two control members being movable essentially normally to said lever, said lever being mounted to rotate in one plane about points defined by said hinges of the control members on said lever.

2. In a motion picture camera as set forth in claim 1, wherein said locking member is arranged on said lever between the hinges of the two control members on said lever, said two control members being movable in opposite directions.

3. In a motion picture camera as set forth in claim 1, wherein a third control member is provided releasing the film advancing and shutter rotating mechanism for a single exposure, said locking member comprising two stops offset from one another in the direction of movement of said rotative stop to permit the same to pass axially through between said stops, said stops being offset from each other transversely to the direction of movement of said rotative stop by a distance which is less than the width of said rotative stop.

4. In a motion picture camera as set forth in claim 1, a snap device, a manually operable handle, whereby the control member releasing the film advancing and shutter rotating mechanism for multiple exposures and the handle are coupled by the snap device omitting intermediate positions of the control member when moving the handle slowly.

References Cited in the file of this patent

UNITED STATES PATENTS

| | | |
|---|---|---|
| 1,825,253 | Victor | Sept. 29, 1931 |
| 2,080,021 | Wittel | May 11, 1937 |
| 2,194,158 | Adams | Mar. 19, 1940 |
| 2,198,417 | Scheibell | Apr. 23, 1940 |
| 2,377,750 | Briskin et al. | June 5, 1945 |
| 2,442,756 | Cisski | June 8, 1948 |
| 2,453,301 | Brown et al. | Nov. 9, 1948 |

FOREIGN PATENTS

| | | |
|---|---|---|
| 603,936 | Germany | Oct. 10, 1934 |
| 182,036 | Austria | May 25, 1955 |